Dec. 15, 1925.                                    1,565,449
J. F. HIGBEE
ROTARY INTERNAL COMBUSTION ENGINE
Filed Nov. 15, 1923        6 Sheets-Sheet 4

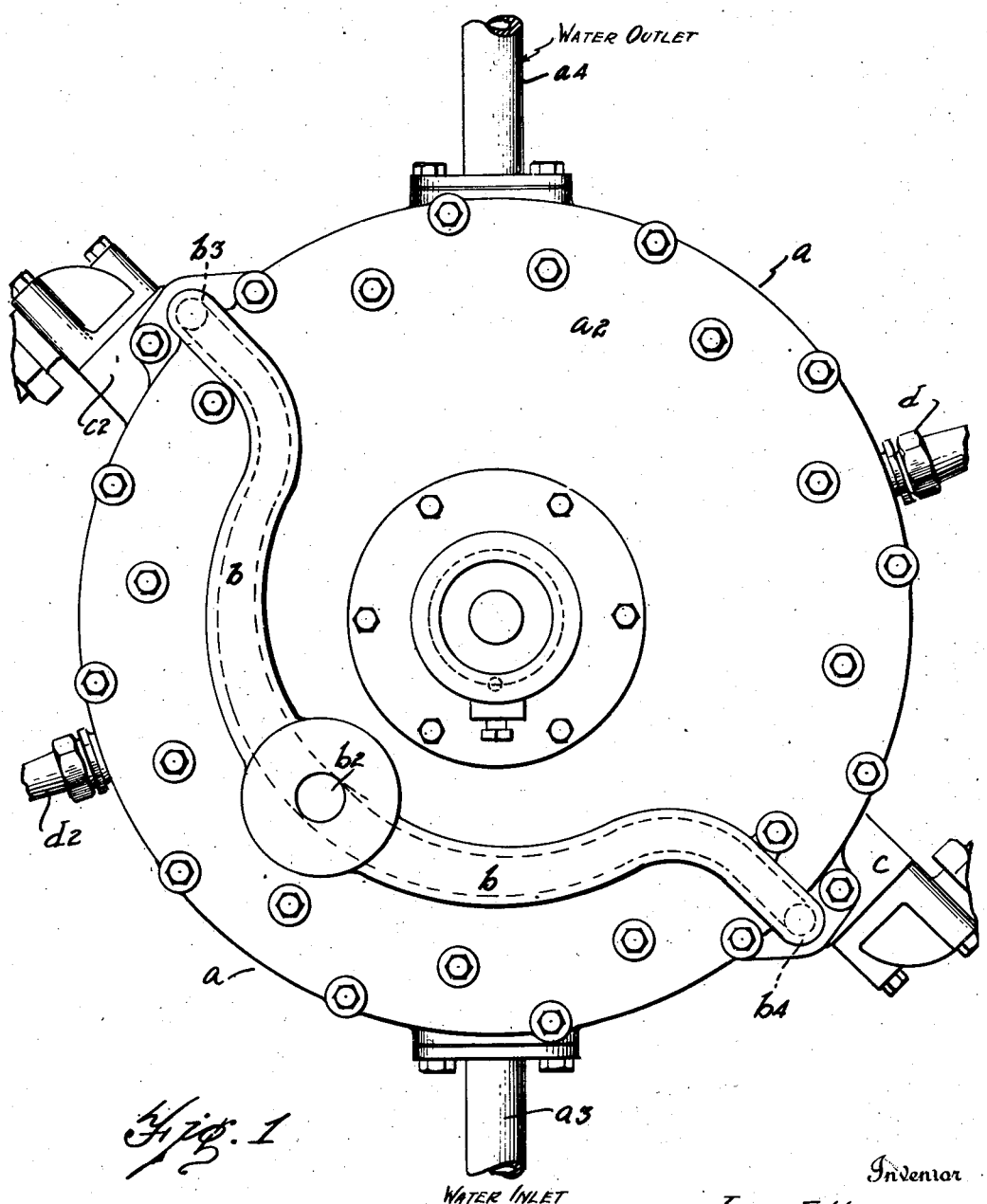

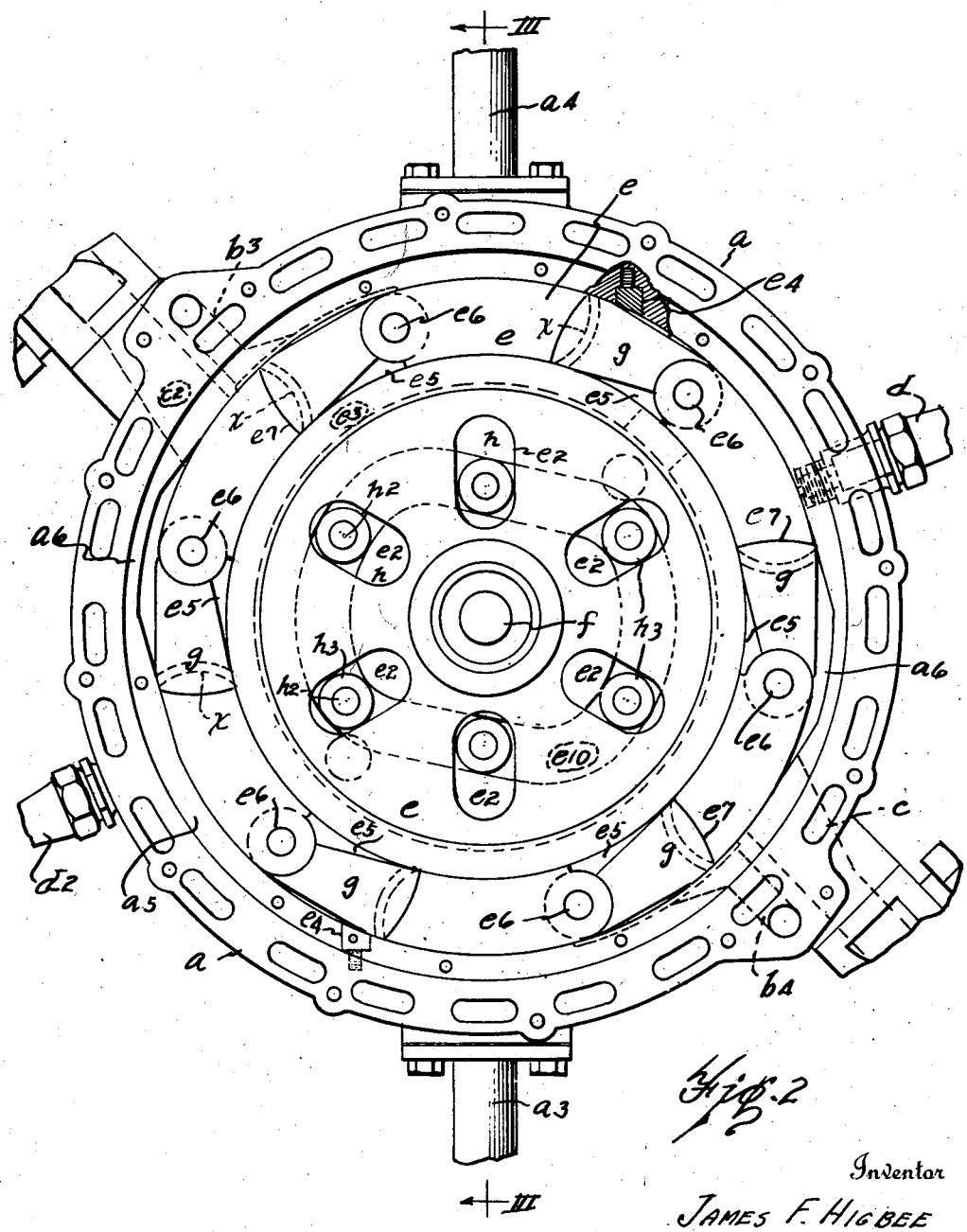

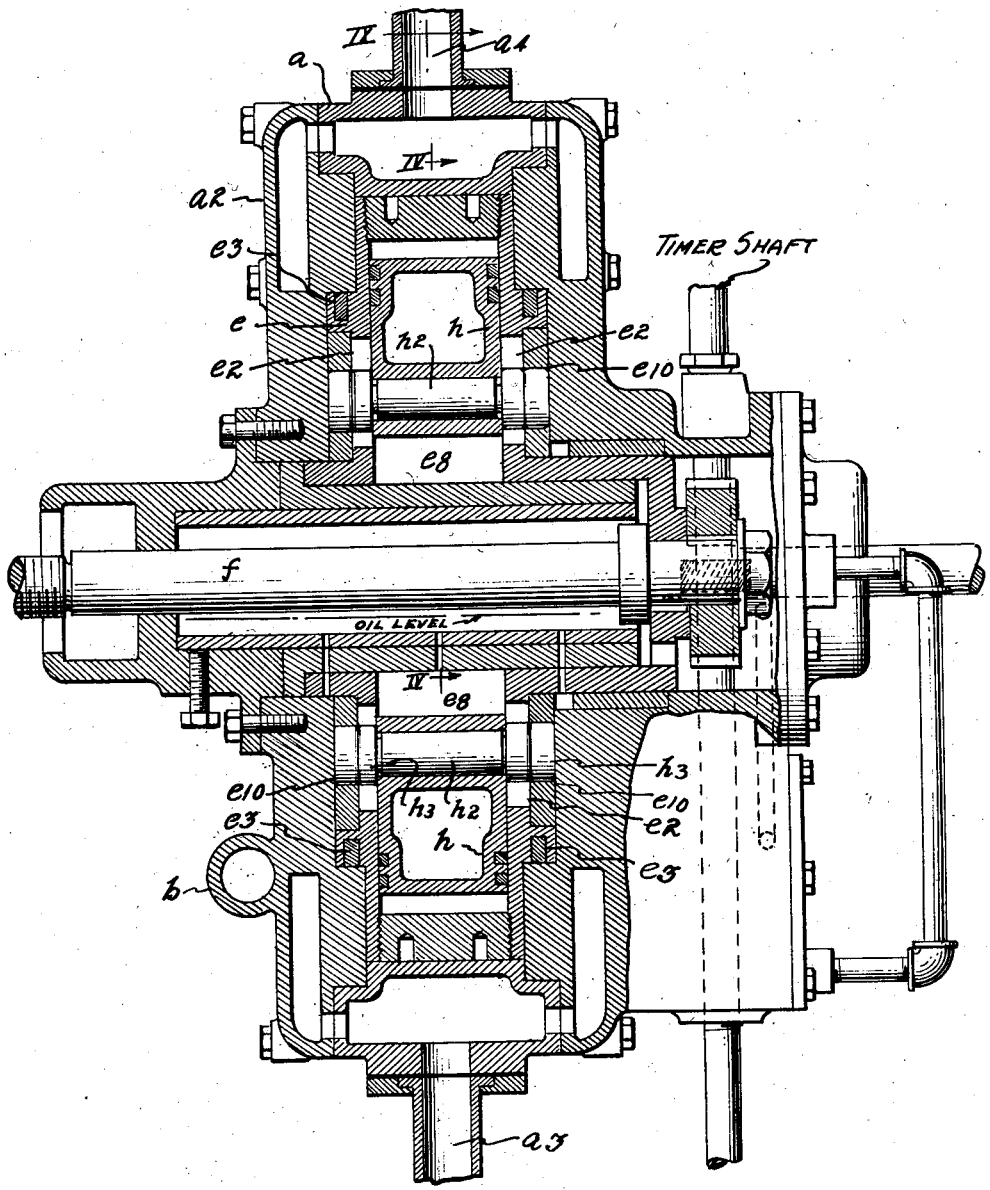

Inventor
JAMES F. HIGBEE
By Ralzemond A. Parker
Attorney

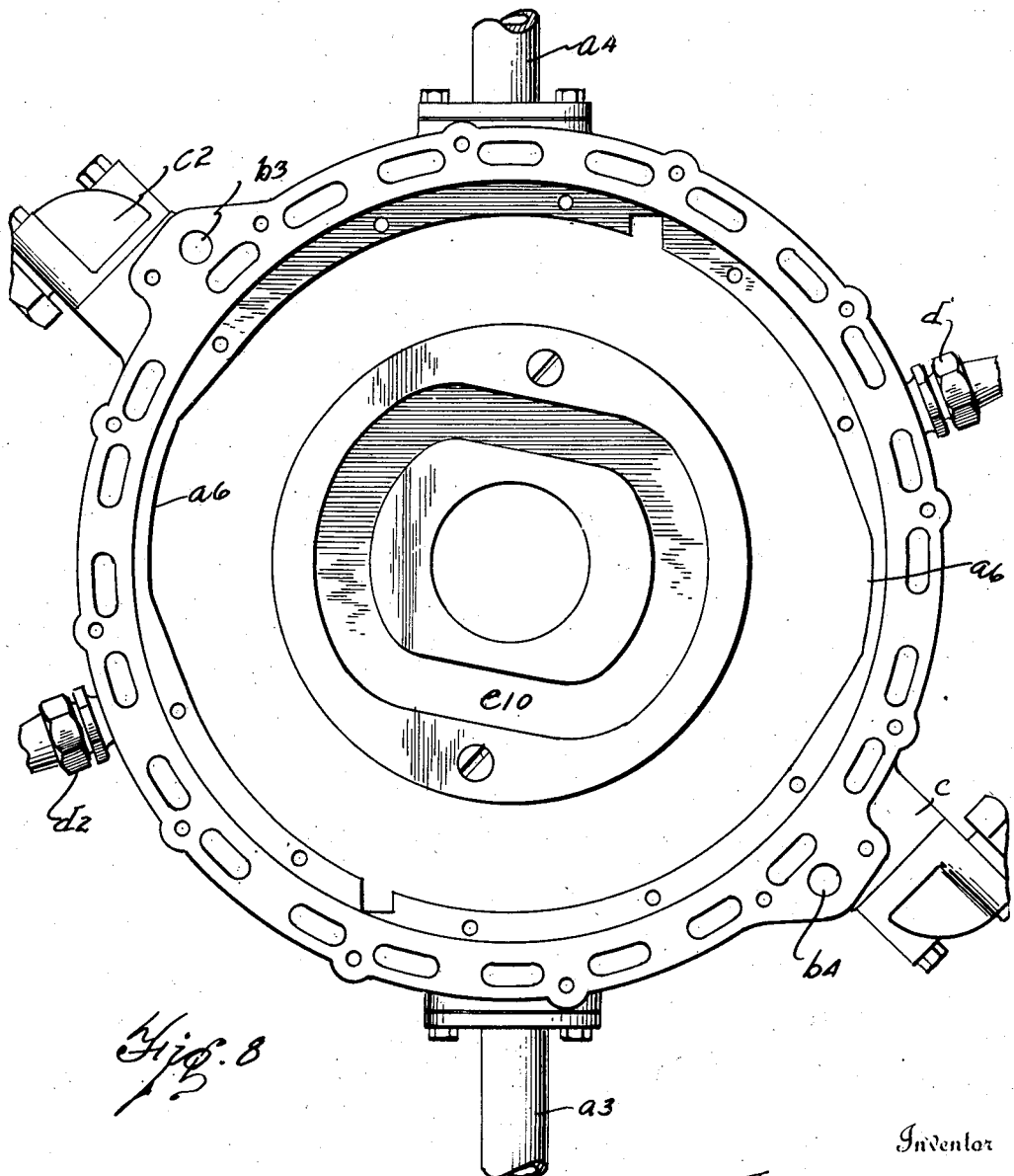

Dec. 15, 1925.
J. F. HIGBEE
1,565,449
ROTARY INTERNAL COMBUSTION ENGINE
Filed Nov. 15, 1923   6 Sheets-Sheet 6

Inventor
JAMES F. HIGBEE
By Ralzymond A. Parker
Attorney

Patented Dec. 15, 1925.

1,565,449

UNITED STATES PATENT OFFICE.

JAMES F. HIGBEE, OF DETROIT, MICHIGAN.

ROTARY INTERNAL-COMBUSTION ENGINE.

Application filed November 15, 1923. Serial No. 674,846.

*To all whom it may concern:*

Be it known that I, JAMES F. HIGBEE, a citizen of the United States, residing at Detroit, county of Wayne, State of Michigan, have invented a certain new and useful Improvement in Rotary Internal-Combustion Engines, and declare the following to be a full, clear, and exact description of the same, such as will enable others skilled in the art to which it pertains to make and use the same, reference being had to the accompanying drawings, which form a part of this specification.

My invention relates to rotary engines and an object of my improvements is to produce an improved rotary engine of the internal combustion type.

In the accompanying drawings,—

Figure 1 is an elevation of an engine embodying my invention.

Fig. 2 is a view similar to Fig. 1, the side plate toward the observer being removed.

Fig. 3 is a section on the line III—III of Fig. 2.

Fig. 8 is an elevation similar to Figs. 1 and 2, the face plate and rotor being removed.

$a$ indicates a cylindrical casing having a removable end plate $a^2$. This casing is provided with a water jacket around its periphery. $a^3$ is the intake pipe for the cooling water and $a^4$ the exit pipe.

$b$ (Fig. 1) is the intake manifold. The explosive mixture enters this manifold at $b^2$ and is delivered to the explosion chambers through ports $b^3$ and $b^4$. $c$ and $c^2$ are the exhaust ports. The intake and exhaust ports are arranged in pairs, an exhaust and inlet port adjacent each other upon one side and an exhaust and inlet port similarly located upon the opposite side of the casing $a$.

$d$, $d^2$ are spark plugs.

$e$ is the rotor fitting within the casing $a$ close to the inner wall thereof so as to turn therein with a close joint between the periphery of said rotor and the interior wall of said casing except at points $a^5$, $a^5$ where the inner wall of the casing bends outward to form the space in which the combustible gases are forced and ignited. The rotor $e$ is secured to the hollow shaft $f$ of the motor.

Figure 9:
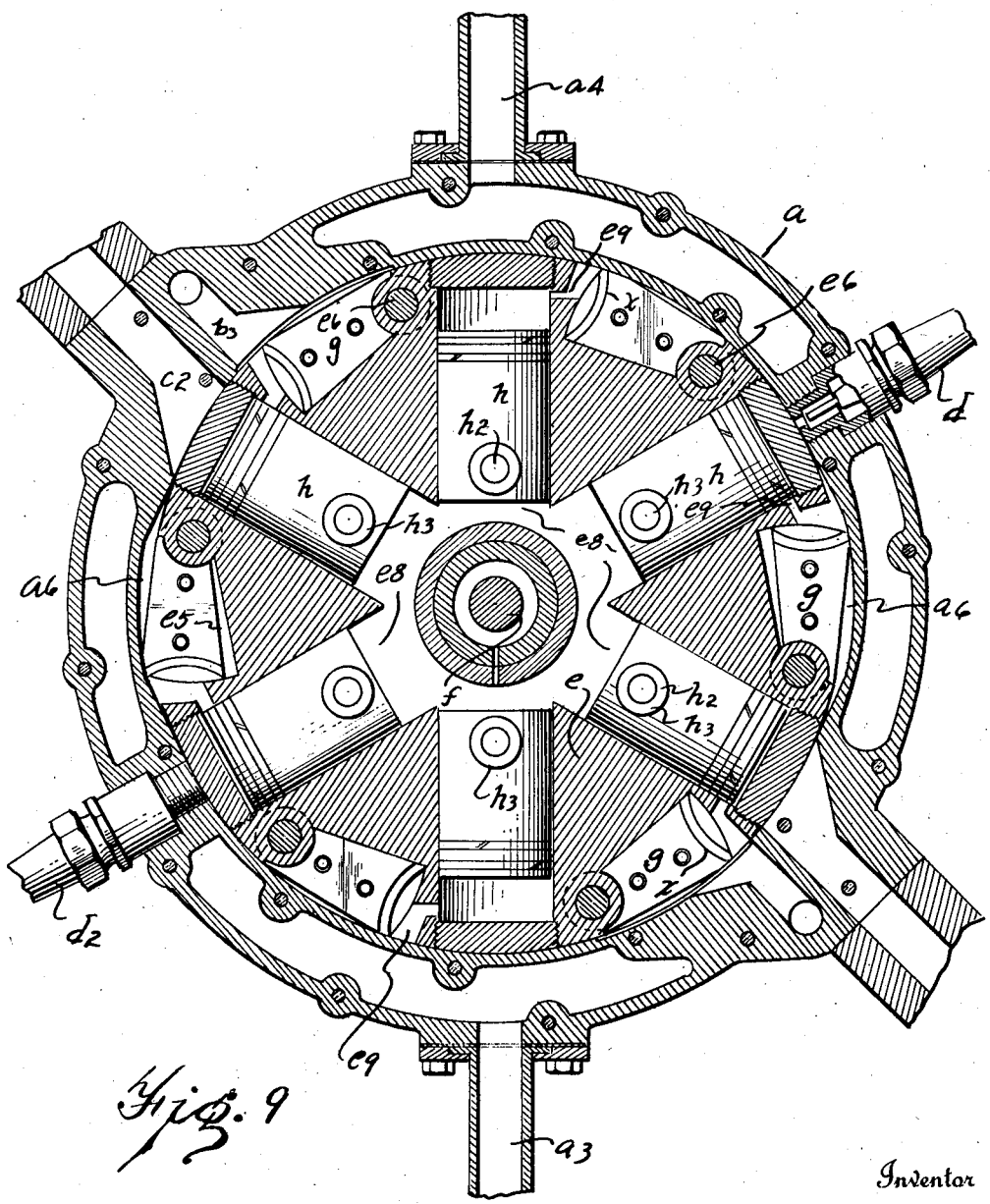
Fig. 9 is a section on the line IX—IX of Fig. 3.

$e^8$ (Figs. 3 and 9) designate radial cylinders in the rotor $e$. These cylinders are closed at their outer ends except for ports $e^9$. $h$ indicates pistons adapted to reciprocate in the radial cylinders $e^8$. These pistons have transverse pins $h^2$ bearing in them and extending laterally therefrom. $h^3$ are friction rollers upon the ends of the pins $h^2$.

$e^2$ (Fig. 2) indicates radial slots through the walls of the rotor $e$, permitting the passage and reciprocation of the ends of the piston pins $h^2$. $e^{10}$ (Figs. 3 and 8) is a cam slot in the inner face of one of the end plates of the casing $a$. There is an entirely similar slot and similarly located in the opposite end plate of said casing. The friction rollers $h^3$ engage in the slots $e^{10}$ and as the rotor turns the pistons $h$ are caused to reciprocate as desired by said cam groove acting upon the friction rollers $h^3$, $h^3$.

$e^3$ is a packing ring in the face of the rotor $e$. $e^4$, $e^4$ are bars fitting in and adapted to reciprocate in slots extending into the casing $a$ from its inner wall and pressed by springs against the periphery of the rotor $e$ to secure tight joints at this position.

$e^5$ indicates slots formed in the periphery of the rotor $e$. Upon the leading end of each of these slots, the rotor being understood as turning in a clockwise direction, are bearings $e^6$, and the other end of each of said slots is formed into an arcuate surface having its axis through the center of the bearing $e^6$.

Figure 7:
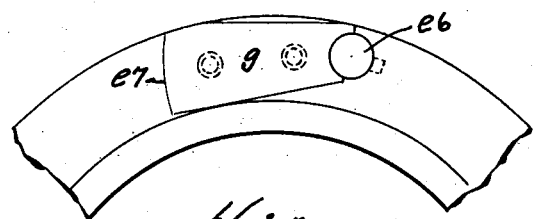
Fig. 7 is a detail elevation of a part of the periphery of the rotor showing an alternative method of pivoting a movable swinging vane.
Figure 4:
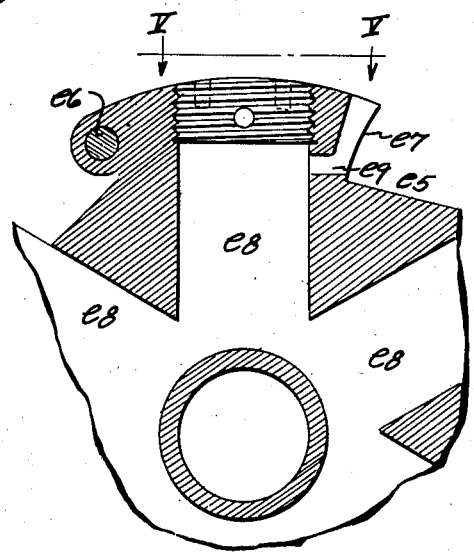
Fig. 4 is a detail sectional view showing a part of the rotor of the engine.
Figure 6:
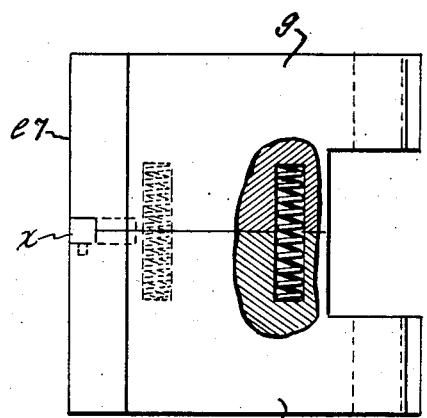
Fig. 6 is a plan view of one of the movable swinging vanes against which the force of the impelling pressure acts to produce the rotary motion.
Figure 5:
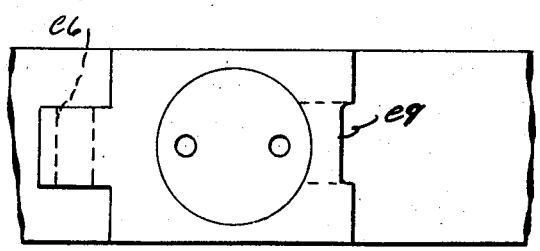
Fig. 5 is a detail plan view of a part of the rotor of the engine looking from the position indicated by the line V—V of Fig. 4.

$g$ indicates movable swinging vanes each of which is pivoted in a bearing $e^6$ and has its free end formed to fit against the surface $e^7$ and move in close engagement therewith as the swinging vane $g$ turns about its arbor in the bearing $e^6$. Instead of a complete bearing, a half bearing may be used, as shown in Fig. 7, which in conjunction with the arcuate surface $e^7$ will serve to hold the swinging vane $g$ in place and permit its oscillating movement. Each swinging vane is divided through its center, as shown in Fig. 6, and springs are provided forcing the parts against the side walls of the case to secure a tight joint. A packing piece $x$ is used to close the end of the joint between the parts.

The operation of the above-described device is as follows:

When a port $e^9$ begins to register with the intake port $b^3$ the piston $h$ in the cylinder $e^8$, with which said port connects, is just beginning to descend or move toward the center of the rotor, impelled by the cam action of the walls of the grooves $e^{10}$. In this way an explosive mixture is drawn into said cylinder. When the port $e^9$ has passed out of registry with the intake port $b^3$ its outer end is closed by the inner surface of the casing $a$ and the piston $h$ begins to move outwardly, compressing the mixture in the upper part of said cylinder. Said port now begins to register with the enlarged portion $a^6$ of the casing $a$, the swinging vanes $g$ being forced outwardly by centrifugal force or otherwise into engagement with the said inner surface. The piston $h$ then forces the explosive mixture into the space behind the adjacent partition which is moved into the enlargement $a^6$. A spark now occurs between the points of the spark plug $d$ and the mixture in the explosion space is ignited, causing a pressure upon the arcuate outer end of the swinging vane $g$, thus imparting a torque to the rotor $e$. On the further movement of the rotor the partition $g$ passes over the edge of the exhaust port $c$ and the explosion space is put into communication with the exhaust port and the gases in the explosion space are expelled by their own pressure.

It will be observed that this series of operations occurs simultaneously upon opposite sides of the rotor. Thus the explosion pressure on the periphery of the rotor is balanced and there are six double explosions in each revolution of the rotor corresponding to the six radial cylinders and six partitions $g$.

What I claim is:

In apparatus of the character described, a stator having exhaust and intake passageways and cam grooves in its opposite side walls, a rotor having radially arranged compression chambers each provided with a piston having bearings on opposite sides mounted in the cam grooves in the stator to reciprocate the pistons upon rotation of the rotor, said rotor provided with a cavity in its outer surface open to the stator adjacent to each compression chamber and intermediate successive compression chambers communicating at one end with one compression chamber, a swinging vane pivoted at one end in said cavity having an arcuate face opposite the opening to the compression chamber closely engaging interiorly said opening an arcuate face of the rotor, providing an explosion space between the arcuate face of the vane and the opposite face of the rotor intermediate the entrance to the compression chamber and the wall of the stator, said parts being so arranged that rotation of the rotor draws an explosive mixture into the compression chambers, discharging the same into the explosion chamber at one end of the swinging vane.

In testimony whereof, I sign this specification.

JAMES F. HIGBEE.